United States Patent
Briongos et al.

(10) Patent No.: US 11,836,244 B2
(45) Date of Patent: Dec. 5, 2023

(54) CLONE APPLICATION DETECTION MECHANISM FOR SECURING TRUSTED EXECUTION ENVIRONMENTS AGAINST A MALICIOUS OPERATING SYSTEM

(71) Applicant: NEC Laboratories Europe GmbH, Heidelberg (DE)

(72) Inventors: Samira Briongos, Heidelberg (DE); Claudio Soriente, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 409 days.

(21) Appl. No.: 17/336,395

(22) Filed: Jun. 2, 2021

(65) Prior Publication Data

US 2022/0245237 A1 Aug. 4, 2022

Related U.S. Application Data

(60) Provisional application No. 63/145,506, filed on Feb. 4, 2021.

(51) Int. Cl.
*G06F 21/00* (2013.01)
*G06F 21/53* (2013.01)
*G06N 20/00* (2019.01)

(52) U.S. Cl.
CPC ............. *G06F 21/53* (2013.01); *G06N 20/00* (2019.01); *G06F 2221/033* (2013.01)

(58) Field of Classification Search
CPC .... G06F 21/53; G06F 2221/033; G06N 20/00
See application file for complete search history.

(56) References Cited

U.S. PATENT DOCUMENTS

| | | | |
|---|---|---|---|
| 2019/0236168 A1* | 8/2019 | Vaswani | G06F 16/2455 |
| 2019/0243963 A1 | 8/2019 | Soriente et al. | |
| 2020/0004552 A1* | 1/2020 | Liu | G06F 9/3865 |
| 2021/0232676 A1* | 7/2021 | Gingell | G06F 21/53 |
| 2021/0409199 A1* | 12/2021 | Tsirkin | H04L 9/3226 |

FOREIGN PATENT DOCUMENTS

EP 3591893 A1 * 1/2020 ........... G06F 21/123

OTHER PUBLICATIONS

Dessouky, Ghada, Tommaso Frassetto, and Ahmad-Reza Sadeghi. "{HybCache}: Hybrid {Side-Channel-Resilient} caches for trusted execution environments." 29th USENIX Security Symposium (USENIX Security 20). 2020. (Year: 2020).*

(Continued)

*Primary Examiner* — Ka Shan Choy
(74) *Attorney, Agent, or Firm* — Leydig, Voit & Mayer, Ltd.

(57) ABSTRACT

A method for detecting a trusted execution environment (TEE) clone application operating on a computing device includes measuring a plurality of read time periods associated with a plurality of monitored cache sets within a memory cache based on executing a first auxiliary thread of a TEE application on the computing device. Each of the read time periods indicating a time period that is used to read data within one of the monitored cache sets. The read time periods are compared with a time threshold to determine one or more cache misses. The TEE clone application is detected as operating on the computing device based on the determined cache misses.

15 Claims, 4 Drawing Sheets

(56) References Cited

OTHER PUBLICATIONS

Priebe, et al., "EnclaveDB: A Secure Databse using SGX," *2018 IEEE Symposium on Security and Privacy*, pp. 264-278, May 1, 2018, Institute for Electrical and Electronics Engineers, Manhattan, NY, USA.

Soriente, et al., "ReplicaTEE: Enabling Seamless Replication of SGX Enclaves in the Cloud," *2019 IEEE European Symposium on Security and Privacy*, pp. 158-171, Jun. 17, 2019, Institute for Electrical and Electronics Engineers, Manhattan, NY, USA.

Liu, Fangfei, et al., "Last-Level Cache Side-Channel Attacks are Practical," In Proceedings of the 2015 IEEE Symposium on Security and Privacy, pp. 605-622, Jul. 17, 2015, IEEE, US.

\* cited by examiner

CLONE APPLICATION DETECTION MECHANISM FOR SECURING TRUSTED EXECUTION ENVIRONMENTS AGAINST A MALICIOUS OPERATING SYSTEM

CROSS-REFERENCE TO PRIOR APPLICATION

Priority is claimed to U.S. Provisional Application No. 63/145,506 filed on Feb. 4, 2021, the entire contents of which is hereby incorporated by reference herein.

FIELD

The present invention relates to a method, system and computer-readable medium for detecting a clone application running in a trusted execution environment (TEE), in particular to enable an application running in another TEE of the same host to have security against forking attacks by a malicious operating system (OS).

BACKGROUND

TEEs, such as Software Guard Extensions (SGX) by the company INTEL (in which the TEEs are referred to by the term "enclaves") enable applications to run in isolation from any other software on the same platform. Furthermore, applications running in TEEs benefit from encrypted and authenticated storage (also referred to by the term "sealing") and cryptographic mechanisms (also referred to by the term "remote attestation") that allow remote third parties to verify the software configuration of the application running in the TEE.

SUMMARY

In an embodiment, the present invention provides a method for detecting a trusted execution environment (TEE) clone application operating on a computing device. The method includes the steps of: based on executing a first auxiliary thread of a TEE application on the computing device, measuring a plurality of read time periods associated with a plurality of monitored cache sets within a memory cache, each of the read time periods indicating a time period that is used to read data within one of the monitored cache sets; comparing the read time periods with a time threshold to determine one or more cache misses; and detecting whether the TEE clone application is operating on the computing device based on the determined cache misses.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
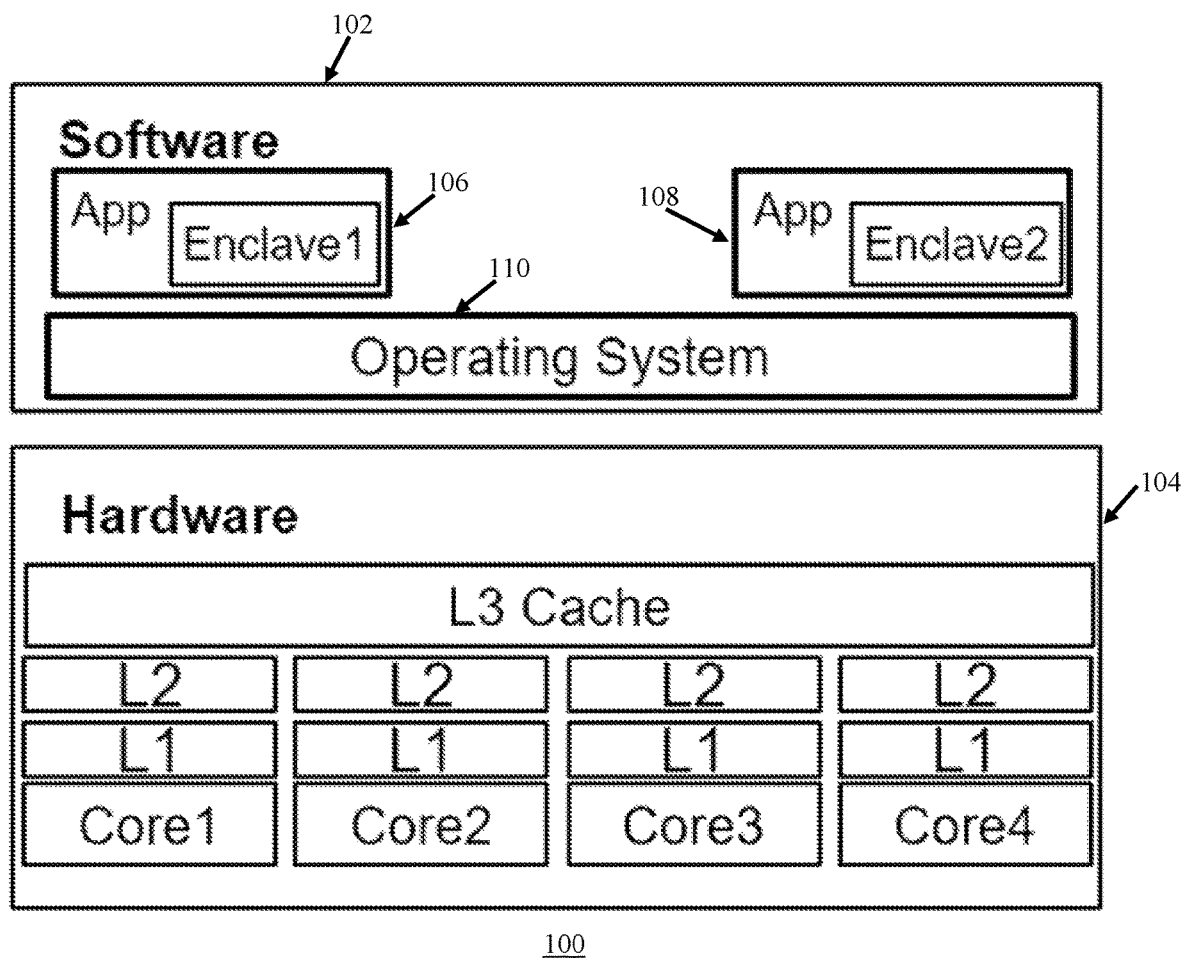
FIG. 1 schematically illustrates a system for detecting a clone application according to an embodiment of the present invention.

Embodiments of the present invention enable an application running on a TEE to detect whether a clone application is running on another TEE on the same host. This is achieved by monitoring contention on shared cache so that each application racing for the same cache locations may easily detect the presence of its clone applications. Detecting the presence of clone applications enables enhancement of the security of the TEE and the application running therein, as well as conserves computational resources by enabling to prevent such clones and the computational resources they demand.

In existing TEE implementations, the OS is responsible for setting up and scheduling the TEE-application to execute. Similarly, the OS mediates access to storage, network communication, and other peripherals by the TEE-application. As such, there is no mechanism that prevents a malicious OS from setting up and executing multiple instances as clones of the same TEE-application. Further, as the OS mediates TEE-application access to storage and other peripherals, it can selectively deliver inputs to different instances/clones to influence their behavior. Such malicious conduct is known as a "forking attack". Preventing TEE-application cloning can effectively prevent forking attacks in the scope of TEEs.

To illustrate the potential of a forking attack, a banking server application running in a TEE is used as an example. In this example, a client with an account balance of $1,000 requests two consecutive transfers of $600 and $500 to other clients. In case only one server application is running, the second transfer request should be denied, as not enough funds are available on the client's account after the first transfer has been completed. However, if a malicious OS runs two instances of the banking server application, and routes each request to each of the instances, both requests can be granted.

Existing TEE implementations, such as INTEL SGX, prevent cross-host cloning by sealing, which uses per-platform keys that prevent a malicious party from copying or transferring one TEE-application instance and its state from one host to another. However, as indicated above, there is no mechanism in the existing TEE implementations to ensure that no clone application of a given TEE application is running on the same host. A clone application is any TEE application that is running exactly the same code as another TEE application, although they might be processing different inputs.

A TEE offers an execution space that provides a high level of security and privacy for applications. Typically, a trusted execution environment provides security features such as integrity of applications and confidentiality of the application's assets. Many of today's trusted execution environments are realized by dedicated, protected parts of a CPU, including the computer's caches and main memory, which is isolated and encrypted. A prominent example of a trusted execution environment is provided by SGX and is referred to as an enclave. Victor Costan, et al., "Intel SGX Explained," Cryptology ePrint Archive, Report 2016/086 (2016), which is hereby incorporated by reference herein, describe SGX in great detail, with section 5 providing an overview of using SGX from a programmer's perspective, and also overview other trusted execution environments. Here, it is noted that the fast protected memory of the CPU's trusted execution environment is usually limited and applications often cannot dynamically allocate protected memory. The fast protected memory in SGX is referred to as the Enclave Page Cache (EPC), which is currently limited to at most 128 MB. Furthermore, for SGX, swapping must be supported by the underlying host operating system and encryption operations are required. Swapping, and in particular encryption, is usually expensive in terms of computational resources and cost and could significantly harm system performance. To the extent embodiments of the present invention refer to SGX below as a prominent example of a trusted execution environment, it is to be understood that such description is applicable also to other trusted execution environments which can be used in embodiments of the present invention.

In some embodiments of the present invention, TEEs, such as INTEL SGX, are installed on network-enabled devices such as smartphones, tablets, laptops, personal computers or servers, for example remotely located or running in the cloud. Software and code are executed in the secure TEEs running on the devices. The terms TEE and enclave are used interchangeably herein and both refer to the secure environment on the devices running the software and code. The expressions TEEs and enclave, as well as secure environment, trusted space or trusted container, as used herein refer to areas running on machines/devices which are able to execute code in isolation from the rest of the software running on the same machine/device.

For the current version of SGX, protected memory is reserved at the start time of an enclave. Memory management, however, may vary between TEEs and even their versions. For example, for SGX, sections 5.2 and 5.3 of the above-referenced paper by Victor Costan, et al. describe the creation and the initialization of an enclave, and the memory management, using particular CPU instructions for setting up the enclave. In SGX, each enclave has its own (virtual) protected memory (ELRANGE), which must be fixed when creating the enclave (ECREATE instruction). The code that runs inside the enclave must be copied from unprotected memory to protected memory via the EADD instruction. This code can then allocate protected memory (within the reserved memory ELRANGE) when it runs. This code should be checked after it is copied into the protected memory and before it runs (remote attestation, see sections 3.3 and 5.8 of the above-referenced paper by Victor Costan, et al.). Further, SGX has the physical protected memory called enclave page cache (EPC), which is referred to herein also as "the fast protected memory," which is reserved at boot time with a limit of 128 MB. Pages can be swapped in and out of the EPC. The swapping must be supported by the operating system as discussed in section 5.5 of the above-referenced paper by Victor Costan, et al. The EPC is shared between all enclaves. The CPU can make sure that an enclave only accesses EPC parts which contain data from the enclave. Setting up the TEE may also include the configuration of the code that runs in the TEE, such as choosing a strategy for swapping segments between protected and unprotected memory. The strategy can also be fixed within the code.

Additional information about attestation for SGX enclaves as an example of a TEE can be found in Scarlata, Vinnie et al., "Supporting Third Party Attestation for INTEL SGX with INTEL Data Center Attestation Primitives," INTEL CORPORATION (2018), which is hereby incorporated by reference herein. Remote attestation is standard and may differ between different TEEs. A key feature of remote attestation is the measurement of the initially loaded code and data to the TEE. This measurement usually comprises a hash of the loaded binary and data, which is checked against a previously registered hash. Typically, there are multiple components involved in the attestation (e.g., the enclave, the application of the enclave, a verifier, and an attestation service).

An example of attestation for enclaves is provided in Anati, Ittai, et al., "Innovative Technology for CPU Based Attestation and Sealing," INTEL CORPORATION (2013), which is hereby incorporated by reference herein. The TEE, e.g., INTEL SGX, supports enclave attestation via its hardware instructions. Attestation for enclaves allows to assert trustworthiness of an enclave by verifying enclave identity and an enclave report. At its initialization (launching phase), two enclave identities, e.g., MRENCLAVE and MRSIGNER, are created. MRENCLAVE is a SHA-256 value of enclave code, data and other measurements when the enclave is built. MRSIGNER is the second enclave identity which includes sealing authority (an entity that signs the enclave). The two enclave identities are created by the trusted computing base (TCB), a hardware component of INTEL SGX security architecture. INTEL SGX provides instructions to create REPORT, a signed structure which includes enclave identities, user data and other additional enclave attributes, for the attestation process. The user data field in the REPORT contains binding information of enclave identities and data inside the enclaves and additional information, e.g., public Diffie-Hellman keys to form a secure channel between the enclave and another enclave. INTEL SGX provides two attestation mechanisms: intra-platform (local) enclave attestation and inter-platform (remote) attestation. In local attestation, the REPORT is signed by a symmetric key. In remote attestation, INTEL SGX provides a special enclave called a quoting enclave. The quoting enclave verifies REPORT and then creates a QUOTE and signs it with asymmetric key. The signed QUOTE is sent to verifying enclave. The verifying enclave needs to communicate with a trusted third party, e.g., INTEL Attestation Service (IAS) to verify this QUOTE.

Embodiments of the present invention enable a TEE-application to verify that no clone is running on the same host, thereby preventing forking attacks by a malicious OS.

Embodiments of the present invention ensure that two TEEs that are running the same code (e.g., two clone applications) are able to generate and detect contention on shared hardware resources, and in particular on a memory cache. Based on a TEE detecting such contention, the TEE may infer the existence of a clone. Contention is caused by forcing data to be stored at specific cache locations and it is detected by checking whether another process is also forcing other data to be stored at those locations.

Contention detection leverages the time of access to the data because in some instances, that access to cached data is appreciably faster than access to non-cached data. In general, a TEE writes data to memory, thereby loading it into the cache at a specific location, and later on reads that same data. According to an embodiment of the present invention, based on the access being relatively fast, the data was present in the cache and the TEE infers that no clone application is running. Based on the access being relatively slow, the data was not present in the cache, as it was likely evicted by another process forcing its data to be stored at those cache locations, and the TEE infers that a clone application is running.

In an embodiment, the present invention provides a method for detecting a trusted execution environment (TEE) clone application operating on a computing device. The method includes the steps of: based on executing a first auxiliary thread of a TEE application on the computing device, measuring a plurality of read time periods associated with a plurality of monitored cache sets within a memory cache, each of the read time periods indicating a time period that is used to read data within one of the monitored cache sets; comparing the read time periods with a time threshold to determine one or more cache misses; and detecting whether the TEE clone application is operating on the computing device based on the determined cache misses.

In an embodiment, the TEE application comprises a main thread of execution, the first auxiliary thread, and a second auxiliary thread of execution. The first auxiliary thread of execution is a monitoring and detection thread and the second auxiliary thread of execution is a timer and counting thread.

In an embodiment, the method further comprises: assigning the TEE application to a processor of the computing device; and concurrently executing, by the processor, the main thread of execution, the monitoring and detection thread, and the timer and counting thread.

In an embodiment, executing the timer and counting thread comprises incrementing a counter variable at each cycle of the processor. The processor is a central processing unit (CPU) and measuring the read time periods is based on the counter variable.

In an embodiment, the method further comprises: generating an array indicating storage locations to be monitored by the first auxiliary thread, wherein the storage locations are based on the plurality of monitored cache sets and a number of lines to be monitored within each of the plurality of monitored cache sets, wherein the plurality of monitored cache sets are a group of cache sets to be monitored within the memory cache. Further, measuring the read time periods associated with the plurality of monitored cache sets within the memory cache is based on storing contents of the array within the storage locations indicated by the array.

In an embodiment, measuring the plurality of read time periods associated with the plurality of monitored cache sets within the memory cache comprises: determining, using a variable associated with a timer and counting thread, each of the plurality of read time periods based on an access time of reading a storage location, of the storage locations, associated with an element of the array.

In an embodiment, comparing the read time periods with the time threshold comprises: determining whether each of the plurality of read time periods is a cache miss or a cache hit based on whether the associated read time period exceeds the time threshold, wherein the cache miss indicates an associated read time period for reading data within a monitored cache set exceeds the time threshold and the cache hit indicates the associated read time period for reading the data within the monitored cache set does not exceed the time threshold; and populating a list indicating whether each of the plurality of read time periods is the cache miss or the cache hit.

In an embodiment, the method further comprises: based on the list having a predefined element threshold, inputting elements of the list into a classifier to generate an output indicating whether a TEE clone application is operating on the computing device.

In an embodiment, the classifier is a numerical threshold and inputting the elements of the list into the classifier to generate the output comprises comparing the numerical threshold with the elements of the list indicating the cache misses to determine whether the TEE clone application is operating on the computing device.

In an embodiment, the classifier is a trained machine learning algorithm and inputting the elements of the list into the classifier comprises inputting the elements of the list into the machine learning algorithm to generate the output indicating whether the TEE clone application is operating on the computing device.

In an embodiment, the method further comprises: loading arbitrary data into the memory cache of the computing device; determining a plurality of access times associated with a plurality of cache misses and a plurality of cache hits based on using a counter value; and determining the time threshold based on computing a mean value associated with the plurality of access times.

In an embodiment, the method further comprises: collecting training data based on performing a plurality of iterations of executing the TEE application, wherein at least a portion of the plurality of iterations comprises executing the TEE application with a concurrently operating TEE clone application; and training a classifier to determine the existence of the one or more TEE clone applications based on the training data.

In an embodiment, the method further comprises: tuning a plurality of parameters based on the training data, wherein determining the one or more cache misses is based on the plurality of parameters.

In another embodiment, the present invention provides a system for determining an existence of one or more trusted execution environment (TEE) clone applications. The system comprises a computing device comprising a processor. The processor comprises a memory cache and one or more processor cores configured to: based on executing a first auxiliary thread of a TEE application on the computing device, measure a plurality of read time periods associated with a plurality of monitored cache sets within the memory cache, each of the read time periods indicating a time period that is used to read data within an associated one of the monitored cache sets; compare the read time periods with a time threshold to determine one or more cache misses; and detect whether the TEE clone application is operating on the computing device based on the determined cache misses.

In a further embodiment, a tangible, non-transitory computer-readable medium having instructions thereon which, upon being executed by one or more processors, alone or in combination, provide for execution of a method according to any embodiment of the present invention.

FIG. 1 schematically illustrates a system 100 (e.g., system model) for detecting a clone application according to an embodiment of the present invention. Multiple TEE applications are installed and run on a host and are managed by a potentially malicious OS. Software resides on the main memory while it is running (on the dedicated enclave page cache (EPC) in case of the enclave's code) and cache memories hold a copy of recently used data, e.g., the instructions or data of the main memory that has just being used. As mentioned above, a TEE may be referred to as an enclave. The OS 110 schedules the enclaves (e.g., the Enclave1 and the Enclave 2) to run on one of the available cores (e.g., Core1 or Core2 of the hardware 104). TEEs have access to per-core L1/L2 caches and system-wide L3 cache.

The time needed for cache access is unable to be manipulated by a potentially malicious OS and depends on the hardware.

In other words, as shown, the system 100 includes software 102 and hardware 104. The system 100 may be and/or include one or more computing devices such as computing platforms, systems, servers, desktops, laptops, tablets, mobile devices (e.g., smartphone device, or other mobile device), or any other type of computing device that generally comprises one or more processing components and one or more memory components. The hardware 104 may be and/or include one or more processors such as a central processing unit (CPU), controller, module, and so on. Each processor may include one or more processing cores (e.g., Core1, Core2, Core3, or Core4) and associated cache memory (e.g., caches). For instance, each core (e.g., Core1) may have dedicated caches (e.g., an L1 cache and an L2 cache) that are capable of storing data including temporary data for the individual core. Further, the hardware 104 may include an L3 cache that is capable of storing data for any of the cores (e.g., Core1 through Core 4) for the particular hardware 104 (e.g., the one or more processors). As shown, cache memory are physical storage locations for storing the data and may be separate from the main memory of the system 100.

The software 102 includes an OS 110 that manages and schedules the execution of applications and/or enclaves such as a first application 106 and/or a second application 108. For example, the OS 110 may determine that Core1 and Core3 are available (e.g., not executing another application) and may use a scheduler to assign Core1 to execute the first application 106 and assign Core3 to execute the second application 108. During execution, Core1 and Core3 have access to their respective L1/L2 caches as well as the L3 cache for the hardware 104. For instance, during the execution, Core1 and Core3 may store data into the L1, L2, and L3 caches as well as access this data at a later time. The time that is used for the cores to access the stored data is unable to be manipulated by a potentially malicious OS (e.g., a potentially malicious OS 110) as it depends on the hardware itself. For instance, a potentially malicious OS 110 may be able to delay retrieval of data from the main memory of the system 100. However, since the caches are part of the processor (e.g., the hardware 104), the OS 110 is unable to influence or manipulate the time used by the cores to actually access the cache data. Accordingly, embodiments of the present invention may use this to determine whether two clone applications (e.g., application 108 is a clone application of application 106) are executing on the system 100. In other words, the time required to obtain the data depends on whether it is cached or not. If it is on the cache, the access time is faster and the OS, including a malicious OS, is unable to change this.

Figure 2:
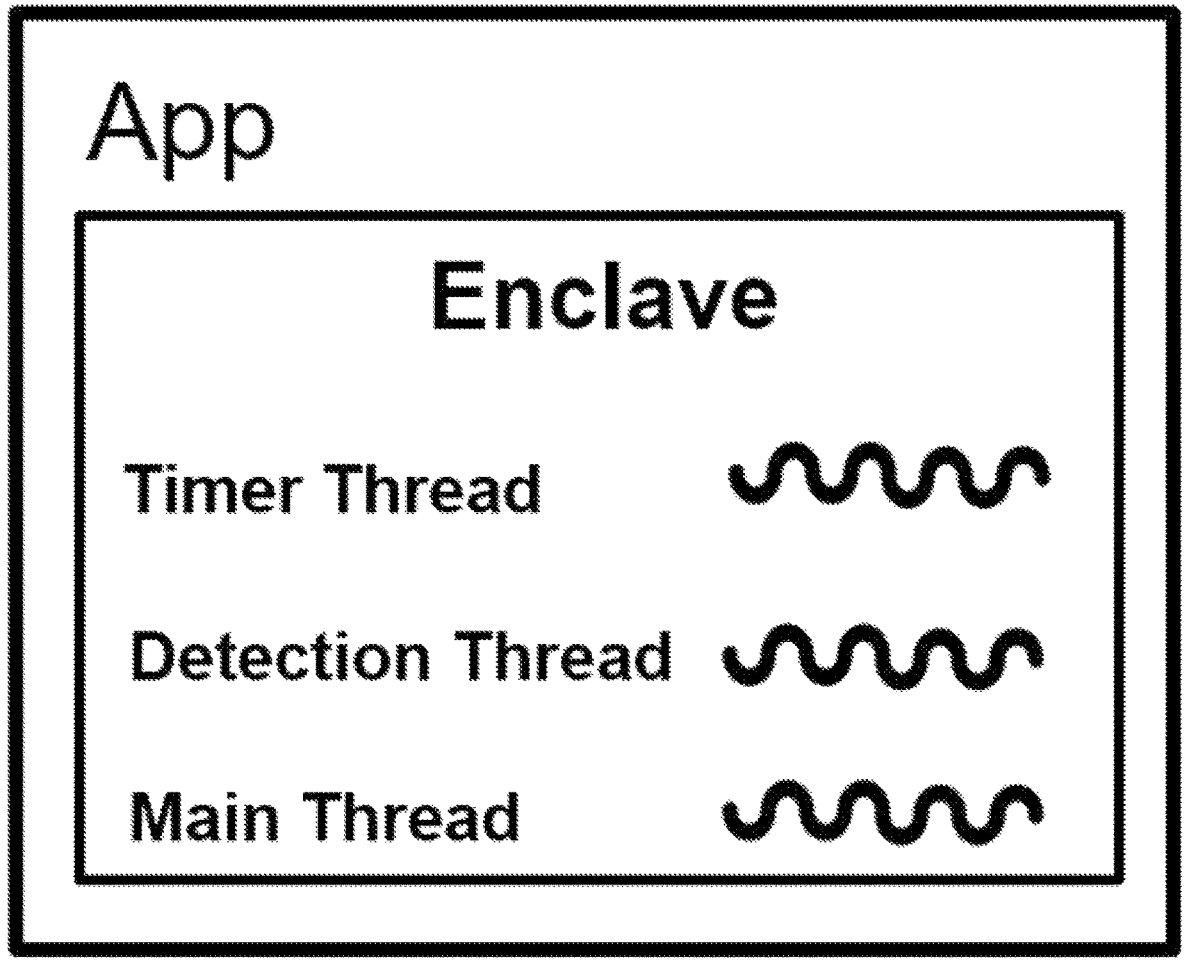
FIG. 2 schematically illustrates the layout of a TEE according to an embodiment of the present invention.

FIG. 2 shows the internal layout of a TEE (which is here referred to as an enclave such as in INTEL SGX) according to an embodiment of the present invention. In contrast to existing TEE implementations, the TEE includes two auxiliary threads besides the main thread, which is the one that carries out the intended computations of the TEE. Advantageously, there is no need to modify nor instrument the code of the main application, and the auxiliary threads execute concurrently with the main thread such that the clone detection mechanism according to embodiments of the present invention does not adversely affect operation of the TEE-application, while at the same time securing that TEE-application against clone applications and attacks by a malicious OS. One of the auxiliary threads acts as a timer thread and the second one of the auxiliary threads uses that timer to measure cache access times and to derive a sequence of cache hits/misses. The cache hits/misses sequence is used to determine whether a clone application is running on the same host.

In other words, the enclave of an application (e.g., application 106) may include a main thread as well as two auxiliary threads. Each thread may be a thread of execution that comprises a set or sequence of programmed instructions or code. After the OS 110 assigns the application/enclave (e.g., application 106) to a processing core (e.g., Core1), the processing core may execute the threads (e.g., by executing these threads concurrently). The main thread may be the one that carries out the intended computations of the TEE/enclave (e.g., perform the intended functionalities of the application such as application 106) and the present invention does not need to modify nor instrument this thread. Instead, the present invention uses the two auxiliary threads (e.g., the timer thread and the detection thread), which will be described in further detail below, to detect clone applications running on the same host based on cache access times.

According to an embodiment of the present invention, the timer thread is a process that tracks cycles of the hardware 104 such as a CPU. For instance, the timer thread may continuously increment a shared variable C. As a result, the value of the variable C increments by one at each cycle of the CPU. Any other process with access to the variable C can measure the CPU cycles required to complete a specific operation OP. In particular, the process may read the variable C right before and right after executing the operation OP and the difference between the two values returned by reading the variable C determines the number of CPU cycles required to perform OP.

In other words, the timer thread may include instructions for incrementing a variable C. In operation, the processing core (e.g., Core1) that is executing the application may also execute the timer thread. For instance, during execution, the processing core may continuously increment a variable C by one for each cycle (e.g., each clock cycle) of the processor (e.g., CPU). By checking the variable C at the beginning of an operation OP and at the end of the operation OP, the processing core executing the application and/or another processing core may determine the number of processor cycles that are used to perform the operation OP.

The monitoring/detection thread (indicated in FIG. 2 as the detection thread) is in charge of observing the state of the cache (e.g., locations within the cache) and determining whether there is a clone application operating based on its observations. Caches in modern processors may be divided in "sets" and each set may be allocate up to N "lines". Any data read or written to the cache memory is placed in the cache at a specific set and line. Both the set and line are determined by the memory address of the data. Some of the bits of this address that identify the set are not controlled by the TEE developer and the actual number of "unknown" bits depends on the architecture. The monitoring/detection thread monitors a group of cache sets S and, for each of the monitored cache sets, a number of lines B. To do so, the monitoring/detection thread uses an array ARR of $..S|*B$ memory locations (where $|S|$ denotes the size of S) such that for each cache set $S_i$ in the cache sets S, exactly B memory locations of ARR map to $S_i$. This is described in further detail below. The array ARR may be built, for example, in accordance with the discussion by Liu, Fangfei, et al., "Last-Level Cache Side-Channel Attacks are Practical," In Proceedings of the 2015 IEEE Symposium on Security and Privacy, pp. 605-622 (Jul. 17, 2015), which is hereby incorporated by reference herein.

Figure 3:
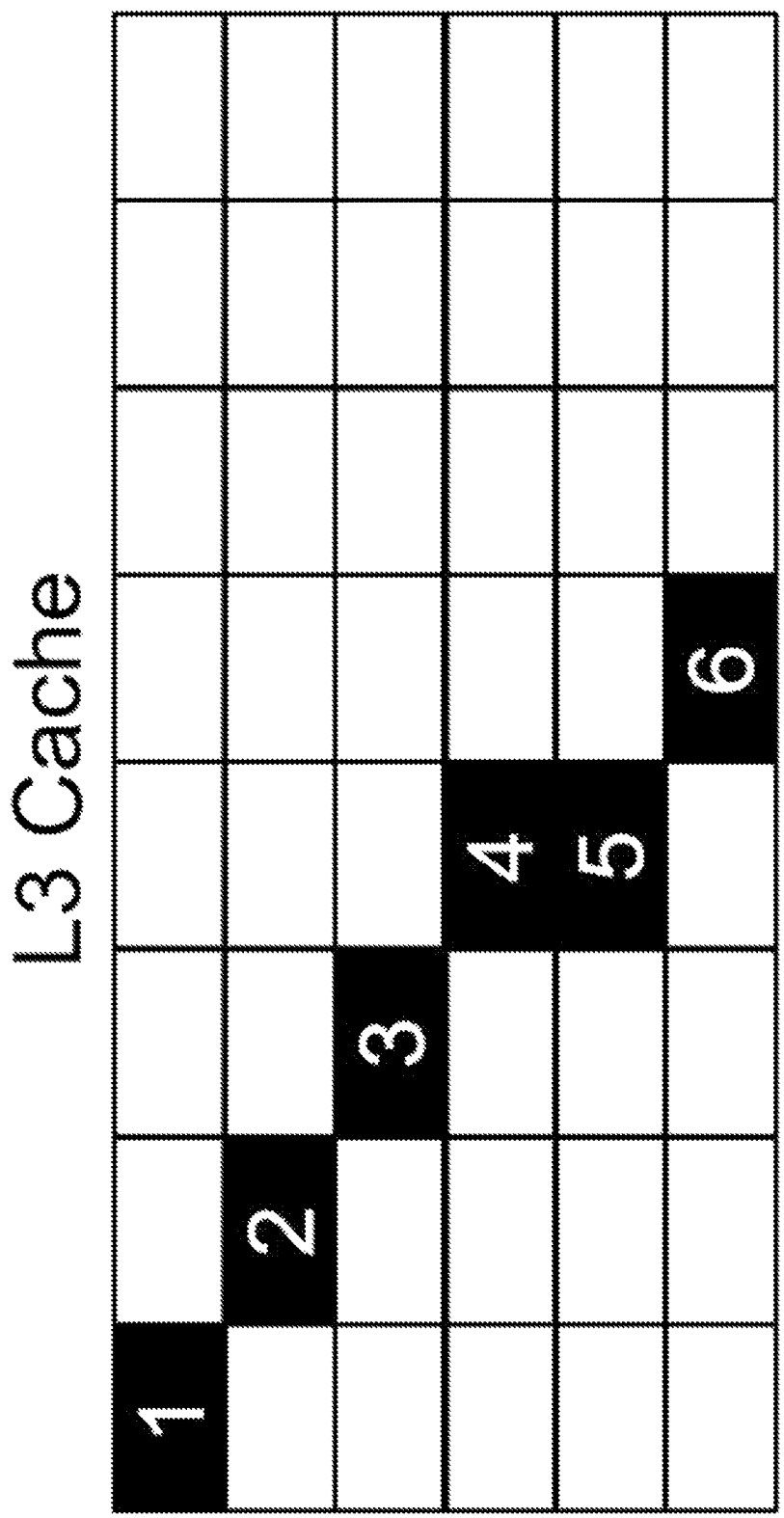
FIG. 3 schematically illustrates a cache layout in which cache sets are monitored in accordance with an embodiment of the present invention.

FIG. 3 shows a simplified cache layout where each box represents one out of forty-eight cache sets, and each set has only one line (N=1). In this example, the monitoring/detection thread is monitoring six cache sets (shadowed and labeled from 1 to 6 on FIG. 3). In other words, S=6 and B=1, which means the array ARR in this case is of size six. Given a cache that has an arbitrary number of sets (e.g. 1024), the number of monitored sets |S| must be chosen to ensure all the sets whose set numbers are not known (considering the memory address of the data) are included. For example, if 2 bits are unknown then $|S|=2^2=4$. If N was 4, B must be chosen so 2*B is greater than N to ensure both enclaves would observe contention but B must be equal or lower than N so an enclave does not see contention if there are no clones, so in this case B should be at least 3. This means that size of ARR would be 4*3=12. The monitoring/detection thread reads each element of the array ARR in a loop and measures the access time by means of the timer thread. This allows the monitoring/detection thread to define a sequence of cache hits and misses that is used to infer the presence of a clone application. Before starting to measure access time to elements of the array ARR, the monitoring/detection thread reads all elements of the array ARR to place them in the cache. Further, the monitoring/detection thread periodically uses the sequence of cache hits/misses and a pre-trained classifier to determine whether a clone application is running in another TEE on the same host.

In the following, the operations carried out by the monitoring/detection thread, given parameters S, B, W and T, according to an embodiment of the present invention are discussed in further detail. The parameters of S, B, W and T are as follows:
S: the group of cache sets to be monitored.
B: the number of lines to be monitored in each of the monitored cache sets.
W: The size of the sliding window and in turn, the size of the input to the classifier.
T: the time threshold to determine whether a memory access caused a cache hit or miss.

A setup operation is carried out only once and is used to define the array ARR of |S|*B memory locations that will be monitored at runtime. The execution phase is carried out by the monitoring/detection thread preferably while the main application is being executed. The execution phase can be carried out in accordance with the following steps:
1. Read all elements of the array ARR so to force them in the L3 cache (e.g., store the elements of the ARR into the corresponding storage locations within the cache).
2. Set a list L as an empty list.
3. Loop over each element of the array ARR as follows:
   a. Read variable C.
   b. Read the next element of the array ARR.
   c. Read variable C.
   d. Compute the access time as the difference between the value read at step 3a. and the value read at step 3c.
   e. Compare the access time computed at step 3d. with parameter T. If the access time is equal or greater than T, then append "miss" to list L; otherwise, append "hit" to list L.
   f. Once list L has at least W elements, the last W elements that have been introduced in list L are fed as input to the classifier described below, which may then output a classification result. The parameter W represents a sliding window defined over the sequence of hits and misses and it is possible to define the frequency at which data is fed to the classifier (e.g., the overlap between consecutive observation windows).

The classifier, which is part of the monitoring/detection thread, takes as input a sequence of W cache hit/misses and determines whether a clone application is running on the same host. The classifier may be based on a threshold. In this case, if the number of cache misses in the sequence is higher than a threshold, then it is considered that there is a clone application running in a TEE on the same host. It is possible in accordance with embodiments of the present invention to use other classifiers such as support vector machines (SVMs), Neural Networks, Naïve Bayes, decision tree or random forests.

In some instances, the classifier may apply more weight on consecutive cache misses (or a sequence of misses) to better determine whether a clone application is running. In some variations, the number of total misses might be weighted more importantly than an order of misses such as an order of consecutive cache misses. The classifier may consider consecutive sequences and/or may increase the size of the observation window such that the entire performance may be evaluated based on the weights and/or consecutive misses.

In order to train the classifier and to tune the parameters, offline training phases may be implemented. In particular, according to an embodiment of the present invention, an offline training phase is run for each of the possible configurations of the parameters S, B, W and T. For instance, after the sets to be monitored S is defined, then the location of the data in the cache may be determined (e.g., the location of the data in the cache may depend on the set number). For each training phase, the application is run multiple times, some with a clone application running on the same host and some without a clone application, and the sequences of cache hits and misses are collected. Each of the collected sequences of cache hits and misses is used as a trace whereby the determination that a clone application was running (or not running) at the same time is used as a positive (or negative) label. The pairs of traces and labels are then used as the training data to train the classifier. Eventually, the configuration of parameters that produces the best classification accuracy is used during the online detection phase.

According to an embodiment of the present invention, the following considerations apply for the selection of parameters S, B, W and T:
S: The cache sets S comprise at least $(2^{(u-1)}+1)$ disjoint sets where u is the number of bits of the address that identify the set which are not under the control of the developer. This grants that at least in one of the sets there will be conflicts with the clone application.
B: The number of lines B lies in the range [N/2+1, N] to ensure contention over the lines of a cache set monitored by two or more clone applications. Additionally, and/or alternatively, if N=1, then B=1 as well. Additionally, and/or alternatively, in some embodiments when N is not even, the condition for B may be such that B is an integer, B>N/2, and B≤N.
W: The value of the elements of the sliding window W can lie in the range [1, |S|*B], where |S| denotes the size of the cache sets S.
T: The time threshold T is machine dependent and is calibrated. Calibration requires estimating both access time for a cache hit and access time for a cache miss. To estimate the access time for a cache hit, arbitrary data D can be loaded into cache and then read, while fetching the counter value before and after reading arbitrary data D. To estimate the access time of a cache miss, the cache can be flushed and then arbitrary data D is read, while fetching the counter value before and after reading arbitrary data D. Given a number of estimates for the access time of cache hit and cache misses, the threshold can be simply defined as the mean of all such estimates.

Cache hits and miss times may be hardware dependent and might not have anything to do with the presence of clones. So, it is the enclave the code is running on that determines these times. The procedure is slightly different to estimate the time for a cache miss because data may need to be ensured to be loaded from the main memory instead of the cache so it is a cache miss. Therefore, the cache may be flushed beforehand.

Figure 4:
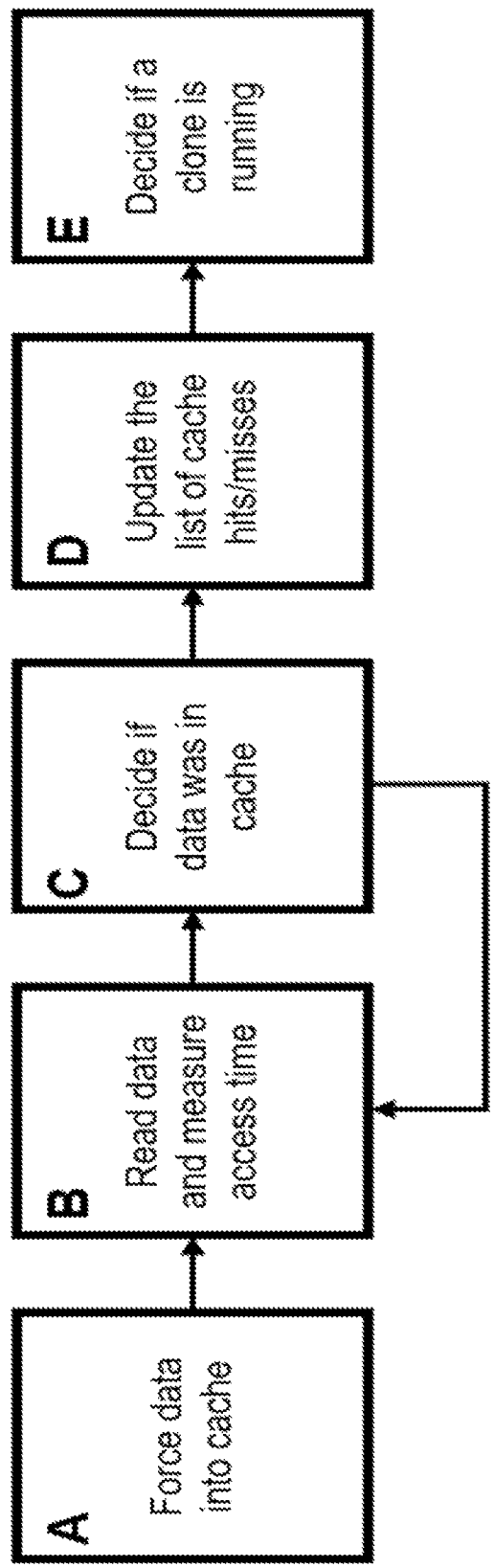
FIG. 4 schematically illustrates a method for detecting a clone application in accordance with an embodiment of the present invention.

FIG. 4 shows a detection phase according to an embodiment of the present inventions with the operation of the detection tool at runtime in the form of a flow chart or block diagram. After data is forced into cache at step A, it is continuously read and, for each read, access time is used to decide whether the data was present in cache or not in steps B and C. Thus, the list of cache misses is updated accordingly in step D and it is used to decide whether a clone application is running on the same host in step E.

Embodiments of the present invention may be used for detection of multiple application instances. In particular, the clone detection tool may be used also to detect a number of clone applications above a given threshold. In some application scenarios, the detection tool is useable to detect whether more than N (with N>1) clones are running on the same host. In order to do so, the offline training phase is modified to collect traces of cache hits and misses while M (with 0≤M≤N) clones are running on the same host. Each trace includes W samples, where each sample is a hit or a miss value and a label that indicates the number of clones. For example, if the maximum number of legit applications is 2 (e.g., only one clone is allowed), the goal is to detect whether there are at least two clones running. Traces where M=0 and M=1 (M<N) are labeled as non-clones (e.g., they are assigned a negative label to be used in the subsequent training phase) and traces where M=2 that indicate there are two clones, are labeled as clones (e.g., they are assigned a positive label). In this case, the value of B may be changed accordingly, so the B*(Number of allowed instances) does not exceed the capacity of the cache set and B*(Number of allowed instances+1) exceeds such capacity. Since it is possible to detect different numbers of clone applications on the system, it is also advantageously possible to determine the exact number of clones running at the same time on the system by changing the classifier or detection model during the runtime once at least one clone application has been detected. In some instances, even when using a threshold (e.g., the given threshold), there might be noise. Therefore, the labels may be used to set the proper value(s) of the threshold within the window.

Thus, embodiments of the present invention monitor and use the cache in a particular way, and measure the amount of cache misses observed on fixed locations, to derive the existence of a clone application running on the same machine or host platform. Even if a malicious OS would be aware of this countermeasure and disrupt it by polluting the cache locations, this would trigger a false positive because the TEE secured by the measures according embodiments of the present invention would infer the existence of a clone application, where, in reality, there is no clone application. This triggering of false positive would be contrary to the goal of a malicious OS to run clones and bypass detection. Apart from this, there is no other way the OS can manipulate the measurements. It cannot prevent two clones from writing at the same cache sets and it cannot tamper with the measurements collected inside the TEE nor make the cache misses appear as cache hits. Accordingly, embodiments of the present invention are particularly secure against a malicious OS even in a case where the malicious OS has knowledge of the detection mechanism, in addition to preventing forking attacks and the other improvements discussed herein.

In contrast to existing TEE implementations, embodiments of the present invention provide for monitoring a number of sets of cache locations and checking cache content modifications in those locations to infer whether a clone application is running in another TEE on the same machine or host platform. Also in contrast to existing TEE implementations, embodiments of the present invention may also provide for checking the access patterns on cache to determine the exact number of clones running on the machine. In contrast to an alternative possibility to assign dynamic identifiers (IDs) to each operation of the TEE for monitoring, embodiments of the present invention do not require changing the protocols.

In an embodiment, the present invention provides a method for determining the existence of a clone application running in a TEE on a physical host, the method comprising the following steps:

1. Implementing a counting thread that increments a counter variable at each CPU cycle.
2. Using a secondary thread to read data and to measure read time, by means of the counting thread.
3. Determining a threshold to distinguish between cache hits and misses on that particular system.
4. Using the read times measured by the secondary thread and the threshold determined in step 3 to find sequences of cache misses that reveal the existence of one or more clone applications.

Embodiments of the present invention can especially advantageously be used to detect clone applications in consensus protocols that rely on TEEs (such as a fast Byzantine fault-tolerant (FastBFT), min-Byzantine fault-tolerant (MinBFT), cheap Byzantine fault-tolerant (CheapBFT)), for example, being implemented on machines which are part of a blockchain network which uses the consensus protocol.

In other words, embodiments of the present invention provide methods and systems for determining an existence of one or more trusted execution environment (TEE) clone applications operating on a computing device (e.g., a host). For example, a TEE application may include a plurality of threads of execution including a main thread of execution, a first auxiliary thread of execution, and a second auxiliary thread of execution. The main thread of execution may be the main application (e.g., the code that performs the functionality of the TEE application) and may be unaltered by the present invention. The first auxiliary thread of execution may be a monitoring and detection thread that determines whether there is an existence of one or more TEE clone applications operating on the computing device. The second auxiliary thread may be a timer and counting thread (e.g., a timer thread and/or a counting thread). The timer and counting thread may comprise instructions for incrementing a counter variable (e.g., variable C described above) at each processor cycle (e.g., each cycle of the CPU).

In operation, the computing device may assign the TEE application, including the three threads, for execution. After, the computing device may execute the TEE application including the three threads. In some instances, the computing device may execute these three threads concurrently (e.g., the main thread may be executed at the same time that the first and second auxiliary threads are being execute so as to detect clone TEE applications).

Based on executing the threads, the enclave may measure a plurality of read time periods associated with a plurality of monitored cache sets within a memory cache. For instance, the computing device may determine (e.g., generate, define, and/or retrieve from memory) an array (e.g., array ARR). The array may be based on the group of cache sets to be monitored (e.g., S described above) and the number of lines to be monitored in each of the monitored cache sets (e.g., B described above). For example, referring to FIG. 3, the array may indicate 6 storage locations (e.g., monitored cache sets) within a memory cache (e.g., the L3 cache) for the first auxiliary thread (e.g., the monitoring and detection thread) to monitor. The first auxiliary thread may read/store contents of the array within the storage locations indicated by the array.

Then, the monitoring and detection auxiliary thread may determine the plurality of read time periods based on storing the contents of the array within the storage locations. For instance, the thread may determine a value of the variable C associated with the counting thread. Then, the thread may read a first element of the array ARR/read the storage location indicated by the first element of the array ARR (e.g., referring to FIG. 3, the thread may read the contents within the storage location labeled as "1"). Following the read operation, thread may determine the value of the variable C. In other words, because the variable C is associated with the CPU cycle (e.g., clock of the CPU), the thread may determine the number of CPU cycles to perform a read operation of the L3 cache at a particular storage location (e.g., storage location "1") using the variable C. The read time period (e.g., an access time) may be the number of CPU cycles to perform a read operation of the L3 cache. The thread may then compare access time/read time period to a time threshold (e.g., the parameter T). Based on the access time being equal or greater than T, then the thread may append a "miss" (e.g., a cache miss) for that particular read operation of the array element. Based on the access time being less than the time threshold T, the thread may append a "hit" (e.g., a cache hit). The thread may populate a list L based on the determination of whether the access time (e.g., the read time period) is a cache hit or a cache miss. After, the thread may repeat the above for the next element of the array ARR (e.g., for the storage location labeled as "2" in FIG. 3) and determine a cache hit/miss as well as populate the list L with the cache hit/miss. The thread may continue to repeat by processing through the array ARR (e.g., "3", "4", "5", "6"). Once it reaches the end of the array ARR, it may repeat starting at the beginning of the array ARR again.

Then, based on the list having a predefined element threshold (e.g., once the list L has at least a predefined element threshold W), the thread may provide at least a portion of the list (e.g., the last W elements) indicating the cache hits and misses to a classifier. The classifier may determine whether one or more TEE clone applications are running on the same host (e.g., the same computing device) based on the elements of the list indicating the cache hits and misses. For instance, the processing core may input the elements of the list (e.g., the last W elements) into the classifier to generate an output indicating whether there is a clone TEE application operating on the same computing device. In some instances, the classifier may be a numerical threshold. The detection thread may then compare the number of cache misses to the numerical threshold and if the number of cache misses exceeds the numerical threshold, the thread may determine that a clone TEE application is operating on the same computing device. In other instances, the classifier may be a machine learning algorithm (e.g., SVMs and/or Neural Networks). The thread may input the elements of the list into the machine learning trained algorithm to generate an output indicating whether a clone TEE application is operating on the same computing device.

In some examples, the computing device may determine the time threshold T that is used to determine whether a read time period is a cache hit or miss. For instance, arbitrary data may be loaded into the memory cache of the computing device. Then, the computing device may determine a plurality of access times associated with a plurality of cache misses and a plurality of cache hits based on using a counter value (e.g., value C from the timer thread). The computing device may determine a mean value associated with the plurality of access times and the time threshold may be the mean value.

In some variations, an offline training phase may be performed to determine one or more parameters used above (e.g., W, T, S, and B) and/or to train the classifier. For instance, the computing device or another computing device may execute the TEE application numerous times (e.g., a plurality of iterations). In some iterations, the TEE application may be executed while also executing one or more clone TEE applications. The computing device or another computing device may collect training data based on performing these iterations and collect the sequences of cache hits and misses. Based on the collected training data, the computing device or another computing device may determine/train a classifier (e.g., a machine learning model such as a neural network). Additionally, and/or alternatively, the computing device or another computing device may adjust the parameters (e.g., W, T, S, and B) and determine the best/most optimal parameters (e.g., the set of parameters S, B, W, and T that are capable of most accurately detecting that a clone TEE application is executing on a same host computing device as the TEE application) for use within the TEE application. In some variations, the computing device or another computing device may generate the first/second auxiliary thread based on the best/most optimal parameters that are determined during the offline training phase.

In each of the embodiments described, the embodiments may include one or more computer entities (e.g., systems, user interfaces, computing apparatus, devices, servers, special-purpose computers, smartphones, tablets or computers configured to perform functions specified herein) comprising one or more processors and memory. The processors can include one or more distinct processors, each having one or more cores, and access to memory. Each of the distinct processors can have the same or different structure. The processors can include one or more central processing units (CPUs), one or more graphics processing units (GPUs), circuitry (e.g., application specific integrated circuits (ASICs)), digital signal processors (DSPs), and the like. The processors can be mounted to a common substrate or to multiple different substrates. Processors are configured to perform a certain function, method, or operation (e.g., are configured to provide for performance of a function, method, or operation) at least when one of the one or more of the distinct processors is capable of performing operations embodying the function, method, or operation. Processors can perform operations embodying the function, method, or operation by, for example, executing code (e.g., interpreting scripts) stored on memory and/or trafficking data through one or more ASICs. Processors can be configured to perform, automatically, any and all functions, methods, and operations disclosed herein. Therefore, processors can be configured to implement any of (e.g., all) the protocols, devices, mechanisms, systems, and methods described herein. For example, when the present disclosure states that a method or device performs operation or task "X" (or that task "X" is performed), such a statement should be understood to disclose that processor is configured to perform task "X".

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for detecting a trusted execution environment (TEE) clone application operating on a computing device, the method comprising:
   based on executing a first auxiliary thread of a TEE application on the computing device, measuring a plurality of read time periods associated with a plurality of monitored cache sets within a memory cache, each of the read time periods indicating a time period that is used to read data within one of the monitored cache sets;
   comparing the read time periods with a time threshold to determine one or more cache misses; and
   detecting whether the TEE clone application is operating on the computing device based on the determined cache misses.

2. The method according to claim 1, wherein the TEE application comprises a main thread of execution, the first auxiliary thread, and a second auxiliary thread of execution, wherein the first auxiliary thread of execution is a monitoring and detection thread and the second auxiliary thread of execution is a timer and counting thread.

3. The method according to claim 2, further comprising:
   assigning the TEE application to a processor of the computing device; and
   concurrently executing, by the processor, the main thread of execution, the monitoring and detection thread, and the timer and counting thread.

4. The method according to claim 3, wherein executing the timer and counting thread comprises incrementing a counter variable at each cycle of the processor, wherein the processor is a central processing unit (CPU), and
   wherein measuring the read time periods is based on the counter variable.

5. The method according to claim 1, further comprising:
   generating an array indicating storage locations to be monitored by the first auxiliary thread, wherein the storage locations are based on the plurality of monitored cache sets and a number of lines to be monitored within each of the plurality of monitored cache sets, wherein the plurality of monitored cache sets are a group of cache sets to be monitored within the memory cache, and
   wherein measuring the read time periods associated with the plurality of monitored cache sets within the memory cache is based on storing contents of the array within the storage locations indicated by the array.

6. The method according to claim 5, wherein measuring the plurality of read time periods associated with the plurality of monitored cache sets within the memory cache comprises:
   determining, using a variable associated with a timer and counting thread, each of the plurality of read time periods based on an access time of reading a storage location, of the storage locations, associated with an element of the array.

7. The method according to claim 6, wherein comparing the read time periods with the time threshold comprises:
   determining whether each of the plurality of read time periods is a cache miss or a cache hit based on whether the associated read time period exceeds the time threshold, wherein the cache miss indicates an associated read time period for reading data within a monitored cache set exceeds the time threshold and the cache hit indicates the associated read time period for reading the data within the monitored cache set does not exceed the time threshold; and
   populating a list indicating whether each of the plurality of read time periods is the cache miss or the cache hit.

8. The method according to claim 7, further comprising:
   based on the list having a predefined element threshold, inputting elements of the list into a classifier to generate an output indicating whether a TEE clone application is operating on the computing device.

9. The method according to claim 8, wherein the classifier is a numerical threshold, and wherein inputting the elements of the list into the classifier to generate the output comprises comparing the numerical threshold with the elements of the list indicating the cache misses to determine whether the TEE clone application is operating on the computing device.

10. The method according to claim 8, wherein the classifier is a trained machine learning algorithm, and wherein inputting the elements of the list into the classifier comprises inputting the elements of the list into the machine learning algorithm to generate the output indicating whether the TEE clone application is operating on the computing device.

11. The method according to claim 1, further comprising:
loading arbitrary data into the memory cache of the computing device;
determining a plurality of access times associated with a plurality of cache misses and a plurality of cache hits based on using a counter value; and
determining the time threshold based on computing a mean value associated with the plurality of access times.

12. The method according to claim 1, further comprising:
collecting training data based on performing a plurality of iterations of executing the TEE application, wherein at least a portion of the plurality of iterations comprises executing the TEE application with a concurrently operating TEE clone application; and
training a classifier to determine the existence of the one or more TEE clone applications based on the training data.

13. The method according to claim 12, further comprising:
tuning a plurality of parameters based on the training data, wherein determining the one or more cache misses is based on the plurality of parameters.

14. A system for determining an existence of one or more trusted execution environment (TEE) clone applications, the system comprising:
a computing device comprising:
a processor comprising:
a memory cache; and
one or more processor cores configured to:
based on executing a first auxiliary thread of a TEE application on the computing device, measure a plurality of read time periods associated with a plurality of monitored cache sets within the memory cache, each of the read time periods indicating a time period that is used to read data within an associated one of the monitored cache sets;
compare the read time periods with a time threshold to determine one or more cache misses; and
detect whether the TEE clone application is operating on the computing device based on the determined cache misses.

15. A tangible, non-transitory computer-readable medium having instructions thereon which, upon being executed by one or more processors, alone or in combination, provide for execution of a method comprising:
based on executing a first auxiliary thread of a trusted execution environment (TEE) application, measuring a plurality of read time periods associated with a plurality of monitored cache sets within a memory cache, each of the read time periods indicating a time period that is used to read data within an associated one of the monitored cache sets;
comparing the read time periods with a time threshold to determine one or more cache misses; and
detecting whether the TEE clone application is operating on the computing device based on the determined cache misses.

* * * * *